(12) United States Patent
Nguyen et al.

(10) Patent No.: US 10,109,056 B2
(45) Date of Patent: Oct. 23, 2018

(54) METHOD FOR CALIBRATION FREE GAZE TRACKING USING LOW COST CAMERA

(71) Applicant: THOMSON LICENSING, Issy de Moulineaux (FR)

(72) Inventors: Phi Bang Nguyen, Rennes (FR); Julien Fleureau, Rennes (FR); Christel Chamaret, Chantepie (FR); Philippe Guillotel, Vern sur Seiche (FR)

(73) Assignee: Thomson Licensing (FR)

( * ) Notice: Subject to any disclaimer, the term of this patent is extended or adjusted under 35 U.S.C. 154(b) by 234 days.

(21) Appl. No.: 14/389,783

(22) PCT Filed: Mar. 29, 2013

(86) PCT No.: PCT/EP2013/056818
§ 371 (c)(1),
(2) Date: Oct. 1, 2014

(87) PCT Pub. No.: WO2013/149966
PCT Pub. Date: Oct. 10, 2013

(65) Prior Publication Data
US 2015/0092983 A1    Apr. 2, 2015

(30) Foreign Application Priority Data

Apr. 2, 2012  (EP) ..................................... 12290118
Jul. 10, 2012  (EP) ..................................... 12305824

(51) Int. Cl.
*G06K 9/46*     (2006.01)
*G06T 7/00*     (2017.01)
(Continued)

(52) U.S. Cl.
CPC ............ *G06T 7/0042* (2013.01); *G06F 3/013* (2013.01); *G06K 9/00597* (2013.01);
(Continued)

(58) Field of Classification Search
CPC ................. G06F 3/013; G06F 3/04842; G06F 2203/04805; G06F 3/011; G06F 3/017;
(Continued)

(56) References Cited

U.S. PATENT DOCUMENTS

| 6,215,898 B1 * | 4/2001 | Woodfill | G06K 9/32 348/47 |
| 6,246,779 B1 * | 6/2001 | Fukui | G06K 9/00268 382/100 |
| 7,538,744 B1 * | 5/2009 | Liu | G06F 3/013 345/7 |

OTHER PUBLICATIONS

Pogalin et al., Gaze Tracking by Using Factorized Likelihoods Particle Filtering and Stereo Vision, Jun. 14-16, 2006 [retrieved Jun. 19, 2016], Third International Symposium on 3D Data Processing, Visualization, and Transmission,pp. 57-64. Retrieved from the Internet: http://ieeexplore.ieee.org/xpls/abs_all.jsp?arnumber=4155710 &tag=1.*

(Continued)

*Primary Examiner* — Andrew Moyer
*Assistant Examiner* — Dennis Rosario
(74) *Attorney, Agent, or Firm* — Jack Schwartz & Associates, PLLC (57) ABSTRACT

A method and device for eye gaze estimation with regard to a sequence of images. The method comprises receiving a sequence of first video images and a corresponding sequence of first eye images of a user watching at the first video images; determining first saliency maps associated with at least a part of the first video images; estimating associated first gaze points from the first saliency maps associated with the video images associated with the first eye images; storing of pairs of first eye images/first gaze points in a database; for a new eye image, called second eye image, estimating an associated second gaze point from the estimated first gaze points and from a second saliency map (Continued)

associated with a second video image associated with the second eye image; storing the second eye image and its associated second gaze point in the database.

19 Claims, 4 Drawing Sheets (51) Int. Cl.
*G06F 3/01* (2006.01)
*G06K 9/00* (2006.01)
*G06T 7/246* (2017.01)
*G06T 7/277* (2017.01)

(52) U.S. Cl.
CPC ......... *G06K 9/4628* (2013.01); *G06K 9/4671* (2013.01); *G06T 7/246* (2017.01); *G06T 7/277* (2017.01); *G06T 2207/10016* (2013.01); *G06T 2207/30041* (2013.01); *G06T 2207/30201* (2013.01)

(58) Field of Classification Search
CPC ....... G06F 3/005; G06F 3/012; G06K 9/4671; G06K 9/3233; G06K 9/00362; G06K 9/00832; A61B 3/113; A61B 3/14; A61B 5/1103; G06T 7/11; G06T 11/60; H04N 19/17; B60R 21/01552
See application file for complete search history.

(56) References Cited

OTHER PUBLICATIONS

Lu et all, Inferring Human Gaze from Appearance via Adaptive Linear Regression, Nov. 6-13, 2011 [retrieved Sep. 14, 2017], 2011 IEEE International Conference on Computer Vision, pp. 153-160. Retrieved from the Internet: http://ieeexplore.ieee.org/xpls/icp.jsp?arnumber=6126237.*

Sugano et al., Calibration-free gaze sensing using saliency maps, Aug. 5, 2010 [retrieved Mar. 1, 2018], 2010 IEEE Conference on Computer Vision and Pattern Recognition,pp. 2667-2674. Retrieved from the Internet: http://ieeexplore.ieee.org/abstract/document/5539984/.*

Vincent et al., Investigating a space-variant weighted salience account of visual selection, Jun. 2007 [retrieved Jun. 1, 2018], Vision Research, vol. 47, Issue 13,pp. 1809-1820. Retrieved from the Internet: https://www.sciencedirect.com/science/article/pii/S0042698907000582.*

Chen et al., "Probabilistic gaze estimation without active personal calibration", 2011 IEEE Conference on Computer Vision and Pattern Recognition, Providence, Rhode Island, USA, Jun. 20, 2011, pp. 609-616.

Ma et al., "Visual Attention Model Based Object Tracking", 11th Pacific Rim Conference on Multimedia Processing, Shanghai, China, Sep. 2010, pp. 483-493.

Miyazato et al., "Real time estimation of human visual attention with dynamic Bayesian network and MCMC-Based Particle Filter", 2009 IEEE International Conference on Multimedia and Expo, Cancun, Mexico, Jun. 28, 2009, pp. 250-257.

Sugano et al., "Appearance-based Gaze Estimation using Visual Saliency", IEEE Transactions on Pattern Analysis and Machine Intelligence, vol. 35, No. 2, Feb. 2013, pp. 329-341.

Tan et al., "Appearance-based eye gaze estimation", Proceedings of the Sixth IEEE Workshop on Applications of Computer Vision (WACV), 2002, pp. 191-195.

Valenti et al., "What are you looking at? Improving visual gaze estimation by saliency", International Journal of Computer Vision, 2012, vol. 98, pp. 324-334.

Wu et al., "Multiple source data fusion via sparse representation for robust visual tracking", 2011 Proceedings of the 14th International Conference on Information Fusion, Chicago, Illinois, USA, Jul. 5, 2011, pp. 1-8.

Le Meur et al., "A coherent computational approach to model bottom-up visual attention", IEEE Transactions on Pattern Analysis and Machine Intelligence, vol. 28, No. 5, May 2006, pp. 802-817.

Viola et al., "Robust real-time object detection", International Journal of Computer Vision, vol. 57, No. 2, 2004, pp. 137-154.

* cited by examiner

Table 1: Algorithm 1 - Typical implementation

Let N be the number of particles. At time t, we proceed as follows:

Propagation: For $i = 1...N$, diffuse $g_t^i \sim p(g_t|g_{t-1})$
Updating: Update the weights of particles according to: $w_t^i = p(I_t|g_t)$ otherwise set $w_t^i = p(I_t, e_t|g_t)$ if $t > N_t$, and the estimated gaze to the database
Normalization: Normalize weights so that $\sum_j^N w_t^j = 1$
Estimation Select K particles with maximum weights, compute $\hat{g}_t = \frac{\sum_{i=1}^K w_t^i \cdot g_t^i}{\sum_{i=1}^K w_t^i}$
Compute the confidence score for the estimated gaze: $conf = \frac{\sum_{i=1}^K w_t^i}{K}$
Update the database with the estimated gaze if its confidence score is greater than the minimum confidence in the database
Resampling Replace the old set $\{g_t^i, w_t^i\}_{i=1}^N$ with the new one $\{g_t^j, w_t^j\}_{j=1}^N$

Fig. 4

Table 2: Algorithm 2 - Cascade implementation

Let N be the number of particles. For the first $N_t$ frames, do step 1, 2, 7, 8 and add the estimated gazes to the database. At time $t > N_t$, we proceed as follows:

1. Propagation: For $i = 1...N$, diffuse $g_t \sim p(g_t|g_{t-1})$
2. Updating: At the first stage, update the weights of particles according to: $w_t^i = p(I_t|g_t)$
3. Resampling: Replace the old set $\{g_t^i, w_t^i\}_{i=1}^N$ with the new one $\{g_t^j, w_t^j\}_{j=1}^N$
4. Normalization: Normalize weights so that $\sum_j^N w_t^j = 1$
5. Updating: At the second stage, update the weights of particles according to: $w_t^i = p(e_t|g_t)$
   $p(e_t|g_t)$ is computed from a database containing previous estimated gazes
6. Normalization: Normalize weights so that $\sum_j^N w_t^j = 1$
7. Estimation Select K particles with maximum weights, compute $\hat{g}_t = \frac{\sum_{i=1}^K w_t^i \cdot g_t^i}{\sum_{i=1}^K w_t^i}$
   Compute the confidence score for the estimated gaze: $conf = \frac{\sum_{i=1}^K w_t^i}{K}$
   Update the database with the estimated gaze if its confidence score is greater than the minimum confidence in the database
8. Resampling Replace the old set $\{g_t^i, w_t^i\}_{i=1}^N$ with the new one $\{g_t^j, w_t^j\}_{j=1}^N$

METHOD FOR CALIBRATION FREE GAZE TRACKING USING LOW COST CAMERA

This application claims the benefit, under 35 U.S.C. § 365 of International Application PCT/EP2013/056818, filed Mar. 29, 2013, which was published in accordance with PCT Article 21(2) on Oct. 10, 2013 in English and which claims the benefit of European patent application No. 12290118.4 filed Apr. 2, 2012 and European patent application No. 12305824.0 filed Jul. 10, 2012.

1. DOMAIN OF THE INVENTION

The present invention relates to a method for eye gaze estimation with regard to a sequence of images.

2. PRIOR ART

Human is the most central factor in all fields of life. Vision is the most essential sense of human-being; about 80-90% of neurons in the human brain are assumed to be involved in visual perception. Eye gaze is considered as an important cue that may reveal useful and irrefutable information from the human mind. The eye gaze is believed to reflect the attention, the behavior and somehow, the emotion of a person within a visual context. In practice, the process of interpretation of eye gaze may be involved in various applications of Human Computer Interaction (HCI) as gaze-based interactive user interfaces, adaptive and interactive content presentation, virtual reality, human behavior study and diagnostic applications, etc. Therefore, eye gaze estimation has become an active research domain during the last several decades but remains a challenging topic due to different difficult aspects of the problem. eye gaze trackers can be generally classified into two categories: intrusive and remote systems according to the way the equipments make contact with the subject. One of the earliest intrusive gaze tracker is based on special contact lens fixed on the eyes that allow to detect its position. These contact lenses contain a sensor (a mirror or an induction coil) that is used to reflect light or to measure the eye position in a high-frequency electromagnetic field. Although providing high accuracy, this method is only suited for medical or cognitive studies due to its uncomfortable and obtrusive use. Electrooculography (EOG) based methods make use of the fact that an electrostatic field exists when eyes rotate. By measuring the electric potential differences of the skin regions around the eyes (with electrodes), the position of the eye can be estimated. EOG technique provides a reliable measurement with simple configuration which enables recording in dark environment (where video-oculography is useless) and which doesn't require the eyes to be opened. The major problem is that the EOG signal suffers from noise due to eye blinking, movement of facial muscles and EOG potential drift (especially in long recording experiments). Video-oculography techniques can also be classified as intrusive methods if they are used in a head-mounted system. In general, an intrusive method allows a high accuracy and free head movement but the main drawback is that it requires close contact to the user that is only restricted to laboratory experiments.

For everyday applications, nonintrusive (or remote) methods are therefore much more preferred. For this category, video-based techniques are the most widely used. We can distinguish two groups of methods: (geometric) model-based and appearance-based methods. The former uses 3D geometric models of the eye to estimate the gaze. The point of regard is determined as the intersection between the 3D gaze direction (composed of the optical axis and the visual axis) and the screen plane. Majority of model-based methods are based on the corneal reflection technique with the use of additional light sources, generally infrared light, to illuminate the eyes. The main idea is to estimate the gaze from the relative position between the pupil center and the glint—the brightest light spot on the eye due to reflection.

In contrast, appearance based methods consider the gaze estimation as a 2D mapping problem between the image features of the eyes and the positions of the gaze on the screen. The mapping function can be found by training a multi-layer neural network, or a regression model like Gaussian process regression or by using a non-linear manifold embedding technique such as Locally Linear Embedding to reduce the high dimensional eye image to 2 dimensions and derive the gaze by linear combination in the low-dimensional space.

Geometric model based approach is generally more accurate (less than one degree) and widely used in commercial eye tracker. However, it requires high resolution camera and additional light sources. Current appearance-based methods are known to be less accurate (with an accuracy of several degrees). More accurate appearance-based methods are known, which can achieve less than one degree of accuracy but with the expense of using extensive calibration points, e.g. disclosed by K. H. Tan, D. J. Kriegman, and N. Ahuja, "Appearance-based eye gaze estimation", Proceedings of the Sixth IEEE Workshop on Applications of Computer Vision (WACV), pages 191-195, 2002.

Almost all current gaze tracking techniques require a calibration process in order to infer certain person-specific eye parameters (in case of geometric based methods) or to regress the corresponding mapping function between the eye movement and the screen (in case of appearance-based methods). Such a process is quite cumbersome, uncomfortable and difficult to be done. Moreover, in some consumer home applications such as interactive game interfaces or adaptive content selection interfaces, active calibration is almost impossible because the eye tracking is required to be transparent to users. Eye gaze estimation methods that do not require explicit calibration exist. However, their model-based method requires multiple cameras and IR light sources.

Another approach focused on using visual saliency as a prior information of the probability distribution of gaze. Y. Sugano, Y. Matsushita, and Y. Sato, "Calibration-free gaze sensing using saliency maps", In Proc. of the 23rd IEEE Conference on Computer, Vision and Pattern Recognition (CVPR), June 2010 propose that if the consecutive eye appearances do not change much, it is evident that the user is focusing on the same fixation point. By clustering and averaging all the training video, a set of "fixation groups" is obtained, each composed of an averaged gaze probability map and its corresponding averaged eye image. These data are served to learn a Gaussian process regression (GPR). Due to the lack of the "true" positions of the gaze points (only the gaze probability is known instead), the training process of the GPR are done thanks to a Monte-Carlo approximation (i.e. samples are generated according to the averaged gaze probability map). However, this approach has some limits. Firstly, in order to go into operating mode, the system needs an off-line and time-consuming training beforehand (i.e. 10 minutes of training for a 10 minutes test). Secondly, the method makes use of many parameters that are empirically determined. Thirdly, in order for the Monte Carlo approximation to reach a desire accuracy, many samples are required at the expense of a significantly increasing computational cost. Nevertheless, the method only achieves a low accuracy of six degrees due to the fact that it is entirely based on saliency information which is not always reliable.

R. Valenti, N. Sebe, and T. Gevers, "What are you looking at? improving visual gaze estimation by saliency", International Journal of Computer Vision, 2012, discloses the use of saliency maps in a post-hoc processing stage to improve the performance of any gaze estimation systems. The foveated region is modelled as a Gaussian kernel around the estimated fixation point. The saliency map is then computed. A meanshift window which is initialized at the fixation point is used to find the closest maxima in the saliency map which is considered as the new corrected gaze point. By assuming that the error in a gaze tracker is identical and affine (e.g. shift or scale), the correction matrix can be obtained by applying a weighted least-square minimization between the estimated and the corrected gazes.

The existing eye gaze sensing systems are far from being widely used in consumer home applications because of two main reasons. The cost of such a system is still high and most systems require a cumbersome and time-consuming calibration procedure.

3. SUMMARY OF THE INVENTION

It is an object of the present invention to propose a method for eye gaze estimation which overcomes the above mentioned disadvantages.

According to the invention, a method to estimate eye gaze estimation with regard to a sequence of images is proposed. As a first step, a visual saliency map for an image, which is a start image in the method is determined. This visual saliency map is used as an a-priori probability distribution of expected eye gaze. Subsequently, a sequence of pictures of the eyes of a user is received. The sequence of pictures of the eyes of a user being acquired with a camera for determining eye appearance, e.g. a conventional web camera. The received pictures are related to the sequence of images, thus, each image of the sequence of images has a corresponding picture of eyes, which is captured when a user is watching said image. Also, only acquiring and receiving pictures of the eyes of a user for every second image of the sequence of images, or for every third image of the sequence of images, or only for distinguished images of the sequence of images is within the scope of the invention. As a following step, a sequence of saliency maps of the images for which a related picture of the eyes of a user was acquired is determined. Then, eye gaze is determined in a recursive manner based on the sequentially received pictures of the eyes of the user and the correspondingly determined sequence of visual saliency maps. The method according to the invention has the advantage that it is a calibration-free gaze tracking method for which good and accurate results are received even with low cost equipment, e.g. such as a low cost web camera. In addition, it is a appearance based model, which is not as complex as geometric model based methods are. Further, it is a remote system which is much more convenient to a user than intrusive methods. The method employs visual saliency in a sophisticated manner to design a transparent calibration gaze sensing system. Using a Bayesian probabilistic framework, gaze positions are inferred with two sources of information, one comes from the eye appearance and the other comes from the visual saliency obtained from the sequence of images, such as a video clip. The method uses the saliency information as an a priori probability distribution of gaze. The final gaze is computed as an a posteriori probability given both the eye appearance and the visual saliency. This has the advantage that the system is much more accurate than conventional visual saliency based methods. In addition, the system allows continuous learning and improving accuracy while the method is executed and does not need to be trained or calibrated in an off-line stage.

Preferably, particle filtering methods are used for determining eye gaze in a recursive manner. The particle filtering method comprises the steps of propagation/diffusion of eye gaze, updating of the weights of particles, normalizing the weights, selecting particles with maximum weights and estimate eye gaze, and updating eye gaze if a confidence score is greater than a minimum confidence score. In an advantageous alternative, the particle filtering method is a cascaded method.

Preferably, determining the eye gaze in a recursive manner is made with the assumption that a current state only depends on the previous state. This has the advantage that a first order Markov process can be used under this assumption.

Preferably, eye pictures and the images are conditionally independent. This has the advantage that straight forward computation of the a posteriori probability can be employed.

Preferably, the particle filtering uses a high density of particles in prosperous regions and a low density of particles in less probable regions. This has the advantage that computational costs are addressed, while maintaining accuracy.

For better understanding the invention shall now be explained in more detail in the following description with reference to the figures. It is understood that the invention is not limited to this exemplary embodiment and that specified features can also expediently be combined and/or modified without departing from the scope of the present invention.

4. LIST OF FIGURES

FIG. 2 discloses the probabilistic relationship of the stimulus image, eye picture and eye gaze FIG. 3 discloses eye gaze estimation without calibration in a two-stage cascade particle filtering framework FIG. 4 discloses a typical one stage implementation of the inventive method FIG. 5 discloses a typical two stage implementation of the inventive method FIG. 6 discloses results of eye gaze estimation according to the invention FIG. 7 discloses a zoomed view of FIG. 6

5. DETAILED DESCRIPTION OF EMBODIMENTS OF THE INVENTION

Figure 1:
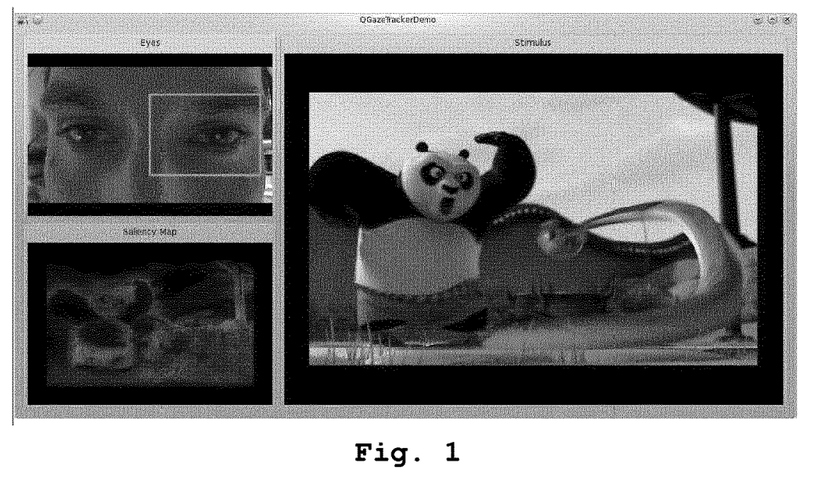
FIG. 1 shows a user interface related to the eye gaze estimation method

FIG. 1 shows a user interface related to the eye gaze estimation method according to the invention. In the right window, an image from a sequence of images such as a video clip can be seen. In the upper left window, a picture of the face of a user which is acquired, e.g. by a low cost web camera, can be seen. The picture is acquired while the user is watching the image which is displayed in the right window. In the lower left window, a visual saliency map of the image displayed in the right window is shown. This saliency map is determined from the image. When a user watches a video clip, a sequence of images is available. For each image of this sequence of images, an eye picture shown in the upper left window is acquired and a visual saliency map shown in the lower left window is determined. Alternatively, only for every second image of the sequence of images, for every third image or the like or only for dedicated images of the sequence of images, eye pictures are acquired and visual saliency maps are determined by a known process.

Figure 2:
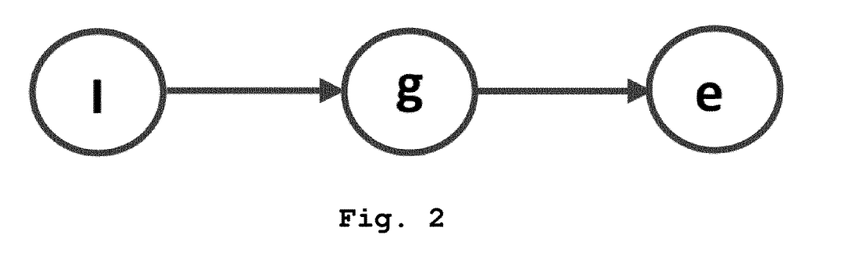

FIG. 2 graphically shows a method for determining the eye gaze of a user.

From the most general viewpoint, a gaze sensing system is a black box that receives as input two sources of information: the visual content (images/videos) and the user's appearance (typically his/her eye images) and outputs the most probable gaze points. The relationship of the stimulus image (I), the eye gaze (g) and the eye image (e) is illustrated via a probabilistic graphical model as shown in FIG. 2. This model describes a Bayesian Network (BN) in which the nodes represent the random variables and the directed edges represent their conditional dependencies. The nodes which are not connected are conditionally independent of each other. Based on this BN, the gaze point is estimated according to the a posteriori probability $p(g_t|I_{1:t}, e_{1:t})$. By using Bayes's rule with the assumption that $I_{1:t}$ and $e_{1:t}$ are conditionally independent (as seen in FIG. 2), this probability is inferred as:

$$p(g_t|I_{1:t},e_{1:t})=p(g_t|I_{1:t})p(g_t|e_{1:t}) \quad (1)$$

Equation 1 characterizes a dynamic system with the state variable $g_t$ and two measurements $I_{1:t}$ and $e_{1:t}$. Assuming that it is a first order Markov process (i.e. the current state only depends on the previous state) and assuming that the observations $e_{1:t}$ and are conditionally independent, we obtain the familiar results as follows (chain rule):

$$p(g_t|I_{1:t}) \propto p(I_t|g_t)p(g_t|I_{1:t-1})= \\ p(I_t|g_t)\int p(g_t|g_{t-1})p(g_{t-1}|I_{1:t-1})dg_{t-1} \quad (2)$$

$$p(g_t|e_{1:t}) \propto p(e_t|g_t)p(g_t|e_{1:t-1})= \\ p(e_t|g_t)\int p(g_t|g_{t-1})p(g_{t-1}|e_{1:t-1})dg_{t-1} \quad (3)$$

where $p(g_t|g_{t-1})$ is the transition density and $p(I_t|g_t)$ as well as $p(e_t|g_t)$ are the observation likelihoods associate to the stimulus image and eye pictures. If the linear assumption and the Gaussian assumptions of the state noise and measurement noise are valid, Equation 2 and 3 have optimal solutions by using the Kalman filter method. In contrast, the particle filter framework is widely adopted as a suboptimal alternative (that preserves the Kalman filter principle) to tackle the problem regardless of the underlying distribution. It approximates the posterior probability density $p(x_t|y_{1:t})$ (where $x_t$ is the state variable and $y_{1:t}$ is the observations) via two steps:

1. Prediction $$p(x_t|y_{1:t-1})=\int p(x_t|x_{t-1})p(x_{t-1}|y_{1:t-1})dx_{t-1}$$

which is recursively computed.

1. Update $$p(x_t|y_{1:t}) \propto p(y_t|x_t)p(x_t|y_{1:t-1})$$

i.e. posterior=likelihood×prior.

The filtering distribution (posterior) $p(x_t|y_{1:t})$ is approximated by a finite set of particles $x_t^i$, and its associated weight $w_t^i:(x_t^i, w_t^i)$ for $i=1, \ldots, N$.

Usually, the samples from $p(x_t|y_{1:t})$ are not drawn directly, but rather from the so-called proposal distribution $q(x_t|x_{1:t-1}, y_{1:t})$ with the weights are updated as:

$$w_t^i = w_t^{i-1} \frac{p(y_t|x_t^i)p(x_t^i|x_{t-1}^i)}{q(x_t^i|x_{1:t-1}^i, y_{1:t})} \quad (4)$$

The trick is that we can choose q(.) freely. A common choice (easy to implement) is to use $p(x_t|x_{t-1})$ for q(.) as in the case of bootstrap filter resulting that the weights become the likelihood. Also, in order to avoid degeneracy problem, resampling can be adopted to replace the old set of particles by the new set of equally weighted particles according to their important weights.

Figure 3:
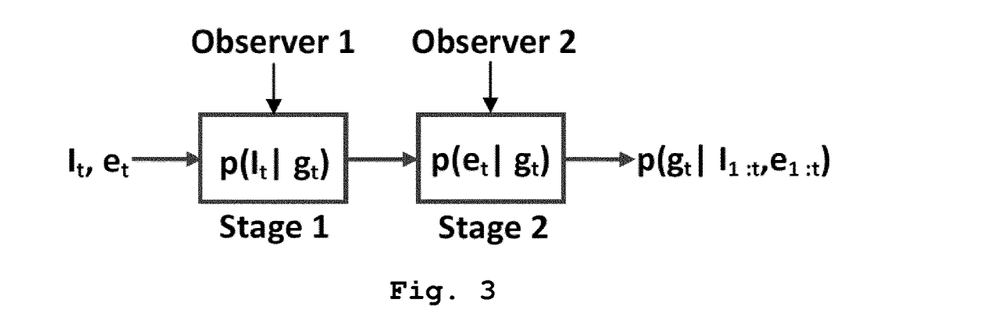

FIG. 3 discloses gaze estimation as a parallel filter framework making use of the images of sequence of images and the eye pictures as observations in two different particle filters. However the estimated distribution of the whole filter is the expectation of the products of the two terms of the right side of Equation 1 and not the product of the expectation of those two latter terms. A correct implementation is obtained by rewriting the Equation 1 as follows:

$$p(g_t|I_{1:t},e_{1:t})=p(I_t,e_t|g_t)p(g_t|I_{1:t-1},e_{1:t-1}) \quad (5)$$

The particle filter is therefore implemented in a more conventional way as a unique particle filter. The observation likelihood is hence computed as:

$$p(I_t,e_t|g_t)=p(I_t|g_t)p(e_t|g_t) \quad (6)$$

and the prior probability is expressed recursively (chain rule) by:

$$p(g_t|I_{1:t},e_{1:t})=\int p(g_t|g_{t-1})p(g_{t-1}|I_{1:t-1},e_{1:t-1})dg_{t-1}$$

In order to use the particle filter framework, the state transition (dynamical model) and the observation likelihood is described in the following.

The gaze position $g_t$ in an image frame is a two dimensional random vector $g_t=(x_t, y_t)$. $x_t$ and $y_t$ are considered as two independent variables centered on the previous state $g_{t-1}$ and thus modeled by the following density:

$$p(g_t|g_{t-1})=\aleph(g_{t-1};\text{diag}(\sigma^2)) \quad (7)$$

where $\aleph(.)$ is the Gaussian distribution and $\text{diag}(\sigma^2)$ is the diagonal covariance matrix. Note that $\sigma^2$ which corresponds to the variance of each independent variable $x_t$ and $y_t$ should be large enough to cover the possible range of the gaze displacement.

The first term of the observation model $p(I_t|g_t)$ is computed from the saliency map assuming that $p(g_t)$ and $p(I_t)$ are uniformly distributed:

$$p(I_t|g_t) = \frac{p(g_t|I_t) \cdot p(I_t)}{p(g_t)} \propto p(g_t|I_t) \quad (8)$$

where $p(g_t|I_t)$ denotes the saliency map at time t.

The second term $p(e_t|g_t)$ is modelled as the similarity between the current eye feature $e_t$ and the eye feature $\hat{e}_t$ estimated from the past gazes $g_{1:t-1}$ and the past eye images $e_{1:t-1}$. This probability is modelled by the reconstruction error $\varepsilon(e_t)$ as disclosed by Y. Wu, E. Blasch, G. Chen, L. Bai, and H. Ling, "Multiple source data fusion via sparse representation for robust visual tracking", pages 1-8, July 2011.

$$p(e_t|g_t) \propto \exp(-\lambda\varepsilon(e_t)) \quad (9)$$

where $\varepsilon(e_t)=\|e_t-\hat{e}_t\|^2$

The estimation of $\hat{e}$ may be obtained via a linear regression scheme between $g_{1:t-1}$ and $e_{1:t-1}$. Let $G=[g_1, g_2, \ldots, g_n]\in\Re^{n\times 2}$ and $E=[e_1, e_2, \ldots, e_n]\in\Re^{n\times D}$. The linear regression could be therefore defined by:

$$G \cdot X = E \quad (10)$$

where is $X\in\Re^{2\times D}$ the projection matrix.

With the number of training samples n>2, the equation 10 is under-determined and hence, the solutions are unstable and should not be trusted. The reason behind this fact is that the eye appearance (of high dimension) is estimated from the gaze position (of two dimensions). In some cases, the problem can be tackled by using Ridge regression but the results are still inaccurate. Moreover the linear assumption between $g_{1:t-1}$ and $e_{1:t-1}$ made in equation 10 is not valid on the whole space and is too strong. To avoid those different issues, preferably:

i) compute $p(g_t|e_t) \propto p(e_t|g_t)$ and estimate $\|g_t - \hat{g}_t\|_2$ instead of $\|e_t - \hat{e}_t\|_2$, ii) estimate $\hat{g}_t$ using a non-linear manifold embedding algorithm.

Locally Linear Embedding (LLE) assumes that on a local region, the manifold can be approximated by an hyperplane. A point $e_t$ is therefore approximated by a linear combination of its neighbors $e_i$ by $e_t = \Sigma_i \alpha_i e_i$ (the number of neighbors being arbitrarily set to K). The optimal weights $\alpha_1, \alpha_2, \ldots, \alpha_K$ minimizes the reconstruction error:

$$\varepsilon = \left\| e_t - \sum_i \alpha_i e_i \right\| \text{ subject to } \sum_i \alpha_i = 1 \quad (11)$$

$\hat{g}_t$ is approximated using the same weights $\alpha_1, \alpha_2, \ldots, \alpha_K$ applied to the corresponding neighbors in the gaze space by:

$$\hat{g}_t = \sum_i \alpha_i g_i \quad (12)$$

The resulting likelihood is hence computed by $$p(g_t|e_t) \exp(-\lambda(\|g_t - \hat{g}_t\|_2)) \quad (13)$$

$\lambda$ is determined such that $p(g_t|e_t) \approx \epsilon$ (where $\epsilon$ is a very small positive number) when $\|g_t - \hat{g}_t\|_2 = D$ (where D magnitude is equivalent to the screen size–largest error). Generally, D is set to the diagonal of the display. Before applying LLE, dimensionality reduction such as PCA is used as a preliminary step for feature extraction to reduce the influence of noise as well as to speed up the LLE algorithm. More effectively, an incremental version of PCA and LLE may be used to make the system faster.

Particle filtering used for gaze tracking is much more challenging than in the context of object tracking. Firstly, the gaze position has a pixel or sub-pixel size in comparison with an object whose size is generally of thousand pixels. Secondly, the gaze distribution is spread all over the state space (full screen) while the movement of an object is restricted to a small area around its previous state. Hence, in order for the particle filter to reach a reasonable accuracy while maintaining the computational cost, the key idea is to reinforce the density of particles in "prosperous" regions and decrease the particle density in "less probable" regions. Two exemplary embodiments are presented. The first one is a typical implementation of the particle filter. The algorithm is given in FIG. 4. For this one, the likelihood model is considered as the product of the two likelihoods as described in Equation 6 and illustrated in FIG. 3. The second exemplary embodiment consists in considering the whole estimation as a two-stage particle filter, where each stage corresponds to one of the two likelihood estimation $p(I_t|g_t)$ and $p(e_t|g_t)$. Here, the updating and resampling steps are done independently for each stage. By this way, the particles are redistributed in the first stage according to the first likelihood $p(g_t|I_t)$ $p(I_t|g_t)$ (more dense sampling in "salient" regions) and then weighted on the only basis of the second likelihood $p(e_t|g_t)$ to make the final gaze estimation. The algorithm for this implementation is given in FIG. 5.

Figure 4:
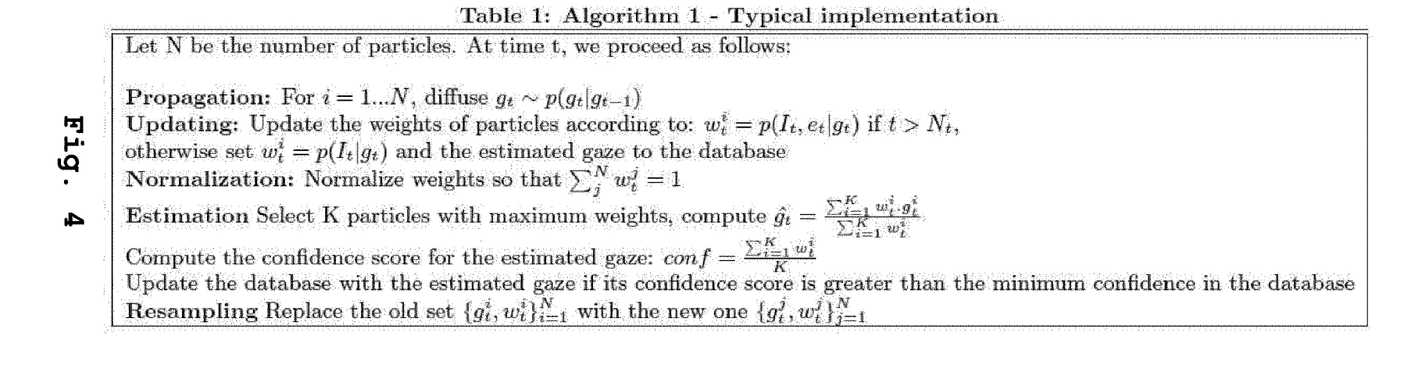
Figure 5:
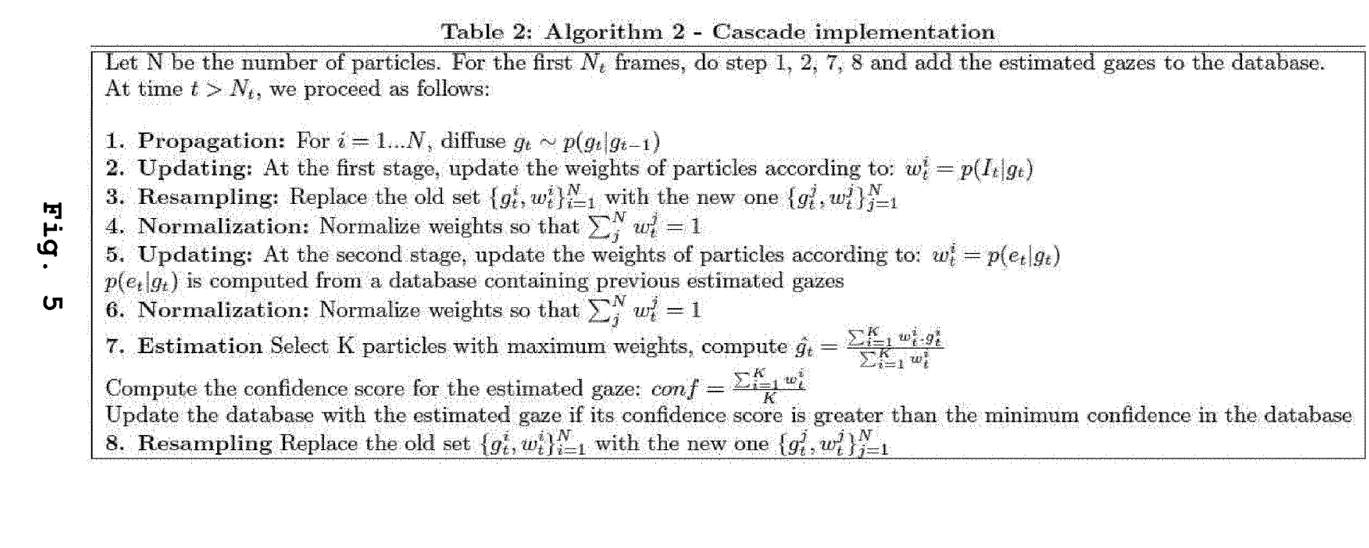

In both algorithms, LLE has to be performed on a set of existing gaze points to compute $p(e_t|g_t)$. In the system according to the invention, for the first $N_t$ frames, the gaze is estimated using only the first stage of the particle filter (saliency map). These estimated gaze points and their corresponding eye images are added to a database that will be used to compute $p(g_t|et)$ after $N_t$ iterations. The database is then continuously updated with the gaze points which have high confidence scores.

The advantage of the cascade implementation is that the accuracy of the whole system relies on the second likelihood which is much more "representative" of the true gaze of the user. The saliency map is just used to redistribute particles, more in "prosperous" regions and less in "less probable" regions. A drawback of this implementation is also due to the fact that the final results depends on the second likelihood. If this likelihood is well modeled and if the saliency is well correlated to the true gaze, the performance of the whole system will be improved, otherwise, it inherits error from the regression step as well as from the bad resampling.

Test results of the method according to the invention are generated on the basis of two sets of video clips. The first set consists of 4 short clips, each of 1 minutes: a) The Kungfu Panda, b) The Mr & Mrs Smith c) The Cheaper and d) The Yuma. The second set consists of four long films: A) Space Odyssey, B) Dreams, C) Nuovo Cinema Paradiso and D) Forrest Gump. Each film is summarized to a 10-minute video clip by extracting and joining multiple 2-second excerpts taking all along the whole movie. The purpose of using these films is to be able to compare our results with the ones obtained by Y. Sugano, Y. Matsushita, and Y. Sato, "Calibration-free gaze sensing using saliency maps", In Proc. of the 23rd IEEE Conference on Computer Vision and Pattern Recognition (CVPR), June 2010 on the same test materials. The sizes of these videos are various with a 25 Hz frame rate and the screen resolution was set to 1280×1024. A chin rest was used to set the head position and maintain a constant distant of 610 mm (two times of the screen height) between the test subjects and the display. Ground truth gaze data were recorded using a SMI RED eye tracker (50 Hz). The video of the user's eye was recorded with a consumer web camera (16 Hz). All data (stimulus, ground truth and eye video) were synchronized before the processing step. Each session of the experiment took about 10 minutes on average to complete. The experiment is continuous and the eye tracker was not re-calibrated during a session. To extract the visual saliency maps, we use the attention model proposed by O. L. Meur, P. L. Callet, D. D. Barba, and D. Thoreau, "A coherent computational approach to model bottom-up visual attention", IEEE Transactions on Pattern Analysis and Machine Intelligence, pp. 802-817, 2006. This saliency model is also enhanced by the face detection using the Viola-Jones's algorithm (P. Viola and M. Jones, "Robust real-time object detection" International Journal of Computer Vision (IJCV), 2002.

For each session, we evaluated the estimated gaze by the whole system in comparison with:

1. The gaze estimated as the maximum peak from the saliency map
2. The gaze estimated using only the regression likelihood $p(g_t/e_t)$ and
3. The gaze from SMI gaze tracker (served as ground truth)

Figure 6:
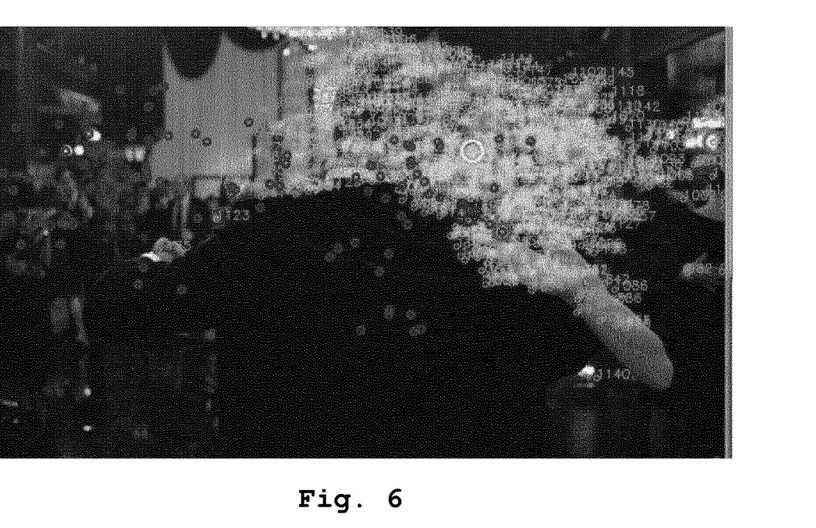
Figure 7:
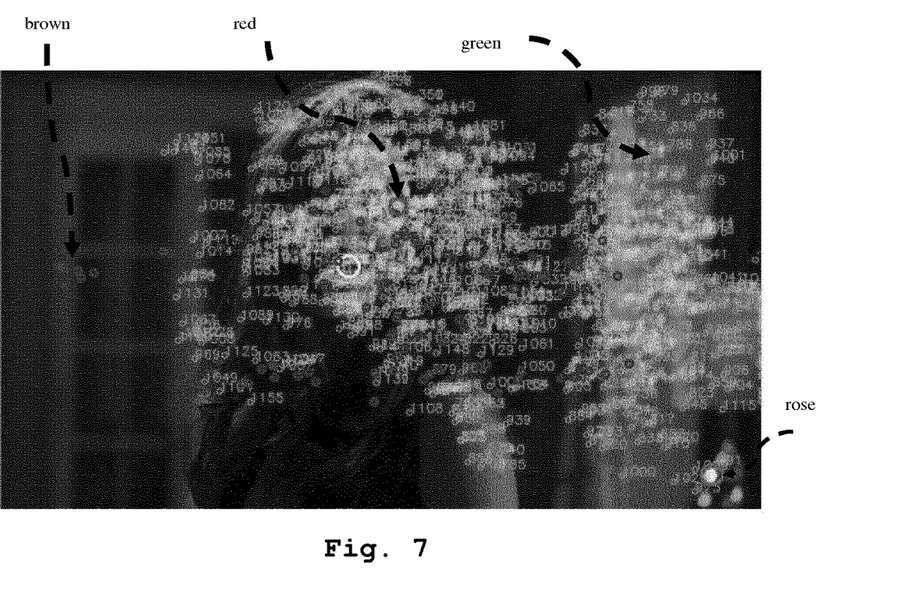

FIG. 6 and FIG. 7 show gaze estimation results according to the invention. The red circle is the final gaze of the whole system. The rose circle is the maximum peak saliency. The green circle is the result from the regression only (eye appearance observation). The brown dots denote the previous estimated gaze that are used for the regression and the green numbers indicate the clouds of particles.

According to the invention, a novel approach for gaze estimation without calibration is proposed. The approach is based on a probabilistic inference and resolved by customized conventional particle filter framework. Be noted that we can resolve the problem by another approach than particle filter which compute the integrals on all possible state space. This a with more accurate results but with a expense of time. Moreover, the proposed method does not requires subjects to watch a 10 minutes video for training. Finally, the proposed approach is general and can be extended to a a set of stage cascade particle filter. Each stage is a source information such as cameras, 2 eyes, head pose tracker, etc. Such an extension can handle head movement just by integrating a head pose tracker into the model as the additional stage particle filter.

This provides a core technology for a non-intrusive and cheap designed eye-tracker based on which many applications may be extrapolated. An interesting one could be an automatic adaptation of a VOD and STB navigation based on eye location preferences of users. To this end, the use of genetic algorithms for hierarchical learning is a potential approach.

According to an advantageous and non limitative embodiment of the invention, the estimation of the gaze of a user watching at a sequence of first video images comprises two phases.

The first phase comprises advantageously a first step of receiving a the sequence of first video images as well as a sequence of first eye images corresponding to images of the eyes of the user watching at the first video images. Each first eye image is associated with one first video image, the first eye image associated with a first video image corresponding to the first image of the eyes of the user when the user watches at the first video image with which the first eye image is associated. In an advantageous way, there is one first eye image for each first video image of the sequence of first video images, the first eye images being for example acquired via a webcam. According to a variant, one first eye image is acquired every 2, 3, 4 or 5 first video images, which means that there is first eye images associated with only a part of the first video images of the sequence of first video images.

Then, in a second step of the first phase, saliency maps are determined for a part of the first video images (for example for the first video images having a first eye image associated with when a first eye image is acquired for only a part of the first video images) or for each and every first video images (for example when a first eye image is acquired and associated with each and every first video image). Saliency maps are determined according to any method known by the skilled person in the art. The determined saliency maps are advantageously associated with the corresponding first video images used for determining them.

Then, in a third step of the first phase, first gaze points are estimated from the determined saliency maps, an estimated first gaze point being associated with a first eye image, i.e. with the first eye image which is associated with the first video image used for determining the saliency map used for determining the estimated first gaze point. In an advantageous way, a first gaze point is estimated for each and every first eye image associated with a first video image from which a saliency map has been determined. According to a variant, a first gaze point is estimated for only a part of the first eye images.

The first gaze point is for example estimated as being the first maximum peak in the saliency map. According to an other advantageous example, the first gaze point is estimated by applying the particle filtering method on the saliency map, the saliency map being considered as an observation likelihood. The particle filtering (PF) method offers the following advantages: (i) PF method provides the unique gaze point at a given time t; (ii) the first gaze point is estimated as the average weighted voting of all particles; (iii) PF method takes into account the temporal relationship in human gaze shift, i.e. the previous gaze point has an impact on the current gaze point.

Then, in a fourth step of the first phase, the estimated first gaze points and their associated first eye images are stored in a database. In an advantageous way, all estimated first gaze points and their associated first eye images are stored in the database until a given number N of pairs of estimated first gaze point/first eye image has been reached, N being a integer greater than or equal to 1 (N being equal to 2, 5, 10, 20 or 100 for example). According to a variant, only the pairs of estimated first gaze point/first eye image having a second confidence factor associated with the confidence we may have in the estimation of the first gaze point greater than or equal to a second threshold value are stored in the database (the second threshold value being for example equal to 0.8, 0.9 or 0.95 when considering that the confidence factor is normalized between 0 and 1).

The second phase advantageously starts when a given number of pairs of estimated first gaze point/first eye image has been stored in the database or after a given delay.

In a first step of the second phase, a second gaze point is estimated for a new eye image, called second eye image, of the user acquired while watching a new video image, called second video image, displayed on a display device. The estimation of the second gaze point associated with the second eye image is advantageously based on all or some of the first gaze points stored in the database and on a second saliency map associated with the second image. To that aim, the second eye image is compared with the first eye images of the database. The first eye image which is the closest from the second eye image is for example selected as being the first eye image which matches the best to the second image (because of they are the most similar). The first gaze point associated with the selected first eye image is then selected and used in the estimation of the second gaze point as being the most probable second gaze point. According to a variant, more than one first eye image (and thus more than one first gaze points) are used for estimating the second gaze point, the selected first gaze points being each weighted with weighting coefficients, the first eye image (and thus the associated first gaze point) being the closest (the most similar) from the second eye image having the greatest weighting coefficient. According to another variant, the estimation of the second gaze point comprises the following steps:

estimating a first gaze probability map from the second saliency map;
expressing the second eye image as a linear regression (for example by using a LLE or any other linear regression method) of the the first eye images of the database (or a part of them), weighting coefficients being associated with the first eye images used in the linear regression;

estimating a third gaze point corresponding to a combination of the first gaze points associated with the first eye images, the combination of the first gaze points being weighted with the same weighting coefficients used in the linear regression but associated with the first gaze points;

estimating a second gaze probability map from the estimated third gaze point, for example by applying a Gaussian distribution with the mean value at the estimated third gaze point;

the second gaze point being then estimated by fusing the first gaze probability map and of the second gaze probability map, the fusion of the two probability maps corresponding to the product of the two probability maps, the fusion being performed at a probabilistic level.

According to an advantageous variant, the second saliency map is used as is during the fusion step, the first probability map being deduced directly from the second saliency map during the fusion step.

Advantageously, the particle filtering method is applied to the result of the fusion as to determine the second gaze point, which has the advantage of taking into account the previously estimated gaze point (temporarily speaking).

The principle of Linear interpolation/Regression method for gaze estimation is as follow:

Assuming that we have a training set of eye images and a set of corresponding gaze points (corresponding for example to the pairs of first eye image/first gaze points stored in the database)

When a new input eye image comes, it is possible to derive its corresponding gaze point by a Linear Interpolation (Regression) from the "training set". This is done based on following property: if 2 eye images are similar, their corresponding gaze points are near to each other.

Hence, (1) Firstly, the new input eye image (the second eye image) will be described as a linear combination of all or part of the first eye images in the "training set"/database: E_new=Sum(Wi*Ei) (using LLE for example)

(2) the associated second gaze point is then derived as a linear combination of all or part of the corresponding first gaze points in the "training set"/database (with the same weighting coefficients Wi): G_new=Sum(Wi*Gi).

Then, during a second step of the second phase, the newly estimated second gaze point and its associated second eye image are stored in the database, which enables to enrich the database and to have more samples to be used in the estimation of another second gaze point. The new pairs of second gaze point/second eye image are systematically added to the database. According to an advantageous variant, only the pairs of second gaze point/second eye image having a first confidence factor (associated with the estimation of the second gaze point) above a first threshold value (the first threshold value being for example equal to 0.8, 0.9 or 0.95 when considering that the confidence factor is normalized between 0 and 1) are stored in the database. According to this variant, the considered new pairs of second gaze point/second eye image either are added to the database or replace the pairs of first gaze point/first eye image of the database having the lowest second confidence factor, i.e. the first threshold value corresponds to the minimal value of the second confidence factors associated with a plurality of first gaze points, the second eye image and its associated second gaze point replacing the first eye image and its associated gaze point having the minimal value as second confidence factor in the database.

The first and second steps of the second phase are advantageously reiterated for each new eye image acquired when the used is watching at a new video image.

Naturally, the invention is not limited to a method for estimating the gaze of a user watching a video on a display device but also extends to the module implementing the method, the module advantageously comprising one or several processors (CPU(s) and/or GPU(s)) configured for executing the steps of the method.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation. As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of calibration-free determining of a gaze to control gaze based interactive interfaces and applications, wherein the method comprises:
   a) receiving, by an image processor, first video images and first eye images, each first eye image being associated with one first video image and corresponding to the image of eyes of a user watching the associated first video image;
   b) determining, by said image processor, first saliency maps associated with at least a part of the first video images;
   c) for at least a part of the first eye images, determining, by said image processor, associated first gaze points from the first saliency maps;
   d) storing, by said image processor, the at least a part of the first eye images with their associated determined first gaze points in a database to form a set of pairs of eye images and associated determined gaze points;
   e) for a new eye image, called a second eye image, determining, by said image processor, an associated second gaze point by:
      determining a first gaze probability map from the second saliency map;
      determining the second eye image by linear regression of said at least a part of the first eye images, weighted coefficients being associated with said at least a part of the first eye images;
      determining the associated second gaze point as a fusion of the first gaze probability map and of a second gaze probability map determined from a third gaze point that corresponds to a combination of the first gaze points associated with the at least a part of the first eye images, the combination of the first gaze points being weighted with said weighted coefficients;
   f) storing, by said image processor, said second eye image and its associated second gaze point in the database, said second eye image and associated second gaze point being added to said set of pairs of eye images and associated determined gaze points;
   g) generating, by said image processor, an eye gaze from the set of pairs of eye images and associated determined gaze points of the database obtained at operation f);
   h) controlling, by said image processor, gaze based interactive interfaces and applications using the generated eye gaze; and
   i) adjusting an accuracy of the generated eye gaze by reiterating operations e) and f) for each new eye image of a plurality of second eye images.

2. The method according to claim 1, further comprising comparing, by said image processor, the second eye image and the first eye images of the database to determine the stored determined first gaze points to be used in the determining of the second gaze point.

3. The method according to claim 1, wherein the determining of the second gaze point uses a particle filtering method.

4. The method according to claim 1, further comprising determining, by said image processor, a first confidence factor associated with the determining of the second gaze point, the second eye image and its associated second gaze point being stored in the database if the first confidence factor is greater than a first threshold level.

5. The method according to claim 1, further comprising applying, by said image processor, a particle filtering method to the result of the fusion of the first and second probability maps to determine the second gaze point.

6. The method according to claim 5, wherein the particle filtering method is a cascaded method.

7. The method according to claim 5, wherein the particle filtering method uses a high density of particles in prosperous regions and a low density of particles in less probable regions.

8. The method according to claim 1, further comprising storing, by said image processor, a first eye image and its associated first gaze point in the database if a second confidence factor associated with the determining of the first gaze point is greater than a second threshold value.

9. The method according to claim 8, wherein the second threshold value corresponds to a minimal value of second confidence factors associated with a plurality of first gaze points, the second eye image and its associated second gaze point being stored in the database replacing the first eye image and its associated gaze point having said minimal value as its second confidence factor.

10. A device configured for calibration-free determining of a gaze to control gaze based interactive interfaces and applications, wherein the device comprises at least an image processor configured for:
   a) receiving a sequence of first video images and a sequence of first eye images, each first eye image being associated with one first video image and corresponding to the image of eyes watching at the first video image it is associated with;
   b) determining first saliency maps associated with at least a part of the first video images;
   c) for at least a part of the first eye images, determining associated first gaze points from the first saliency maps;
   d) storing the at least a part of the first eye images with their associated determined first gaze points in a database to form a set of pairs of eye images and associated determined gaze points;
   e) for a new eye image, called second eye image, determining an associated second gaze point by:
      determining a first gaze probability map from the second saliency map;
      determining the second eye image by linear regression of said at least a part of the first eye images, weighted coefficients being associated with said at least a part of the first eye images;
      determining the associated second gaze point as a fusion of the first gaze probability map and of a second gaze probability map determined from a third gaze point that corresponds to a combination of the first gaze points associated with the at least a part of the first eye images, the combination of the first gaze points being weighted with said weighted coefficients;

f) storing said second eye image and its associated second gaze point in the database, said second eye image and associated second gaze point being added to said set of pairs of eye images and associated determined gaze points, g) generating an eye gaze from the set of pairs of eye images and associated determined gaze points of the database obtained at operation f);

h) controlling gaze based interactive interfaces and applications using the generated eye gaze; and i) adjusting an accuracy of the generated eye gaze by reiterating operations e) and f) for each new eye image of a plurality of second eye images.

11. The device according to claim 10, wherein the at least an image processor is further configured for comparing the second eye image with the first eye images of the database to determine the stored determined first gaze points to be used in the estimating of the second gaze point.

12. The device according to claim 10, wherein the at least an image processor is further configured for determining a first confidence factor associated with the determining of the second gaze point, the second eye image and its associated second gaze point being stored in the database if the first confidence factor is greater than a first threshold level.

13. The device according to claim 10, wherein the at least an image processor is configured to implement a particle filtering method for determining the second gaze point.

14. The device according to claim 10, wherein the at least an image processor is configured to apply a particle filtering method to the result of the fusion of the first and second probability maps to determine the second gaze point.

15. The device according to claim 14, wherein the particle filtering method is a cascaded method.

16. The device according to claim 14, wherein the particle filtering method uses a high density of particles in prosperous regions and a low density of particles in less probable regions.

17. The device according to claim 10, wherein the at least an image processor is further configured to store a first eye image and its associated first gaze point in the database if a second confidence factor associated with the determining of the first gaze point is greater than a second threshold value.

18. The device according to claim 17, wherein the second threshold value corresponds to a minimal value of second confidence factors associated with a plurality of first gaze points, the second eye image and its associated second gaze point being stored in the database replacing the first eye image and its associated gaze point having said minimal value as a second confidence factor.

19. A non-transitory computer-readable medium comprising a computer program product recorded thereon and capable of being run by an image processor for calibration-free determining of a gaze to control gaze based interactive interfaces and applications, the computer program product including program code instructions for a) receiving, by an image processor, first video images and first eye images, each first eye image being associated with one first video image and corresponding to the image of eyes of a user watching the associated first video image;

b) determining, by said image processor, first saliency maps associated with at least a part of the first video images;

c) for at least a part of the first eye images, determining, by said image processor, associated first gaze points from only the first saliency maps;

d) storing, by said image processor, the at least a part of the first eye images with their associated determined first gaze points in a database to form a set of pairs of eye images and associated determined gaze points;

e) for a new eye image, called a second eye image, determining, by said image processor, an associated second gaze point by:
   determining a first gaze probability map from the second saliency map;
   determining the second eye image by linear regression of said at least a part of the first eye images, weighted coefficients being associated with said at least a part of the first eye images;
   determining the associated second gaze point as a fusion of the first gaze probability map and of a second gaze probability map determined from a third gaze point that corresponds to a combination of the first gaze points associated with the at least a part of the first eye images, the combination of the first gaze points being weighted with said weighted coefficients;

f) storing, by said image processor, said second eye image and its associated second gaze point in the database, said second eye image and associated second gaze point being added to said set of pairs of eye images and associated determined gaze points;

g) generating, by said image processor, an eye gaze from the set of pairs of eye images and associated determined gaze points of the database obtained at operation f);

h) controlling, by said image processor, gaze based interactive interfaces and applications using the generated eye gaze; and i) adjusting an accuracy of the generated eye gaze by reiterating operations e) and f) for each new eye image of a plurality of second eye images.

* * * * *